W. DUCHEMIN.
Sewing-Machines for Boots and Shoes.
No. 135,787. Patented Feb. 11, 1873.
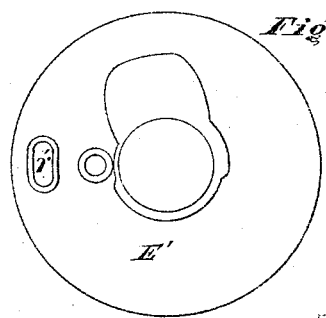
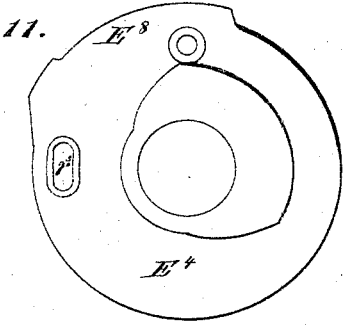
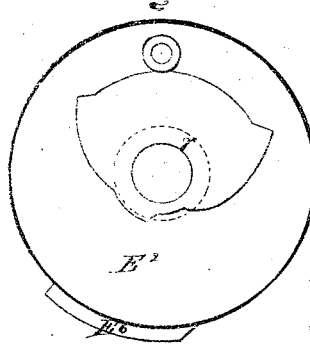
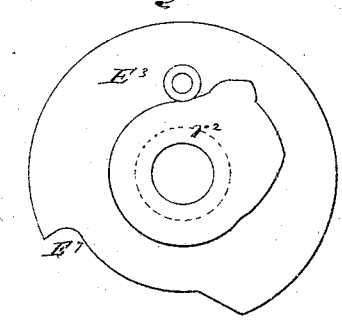
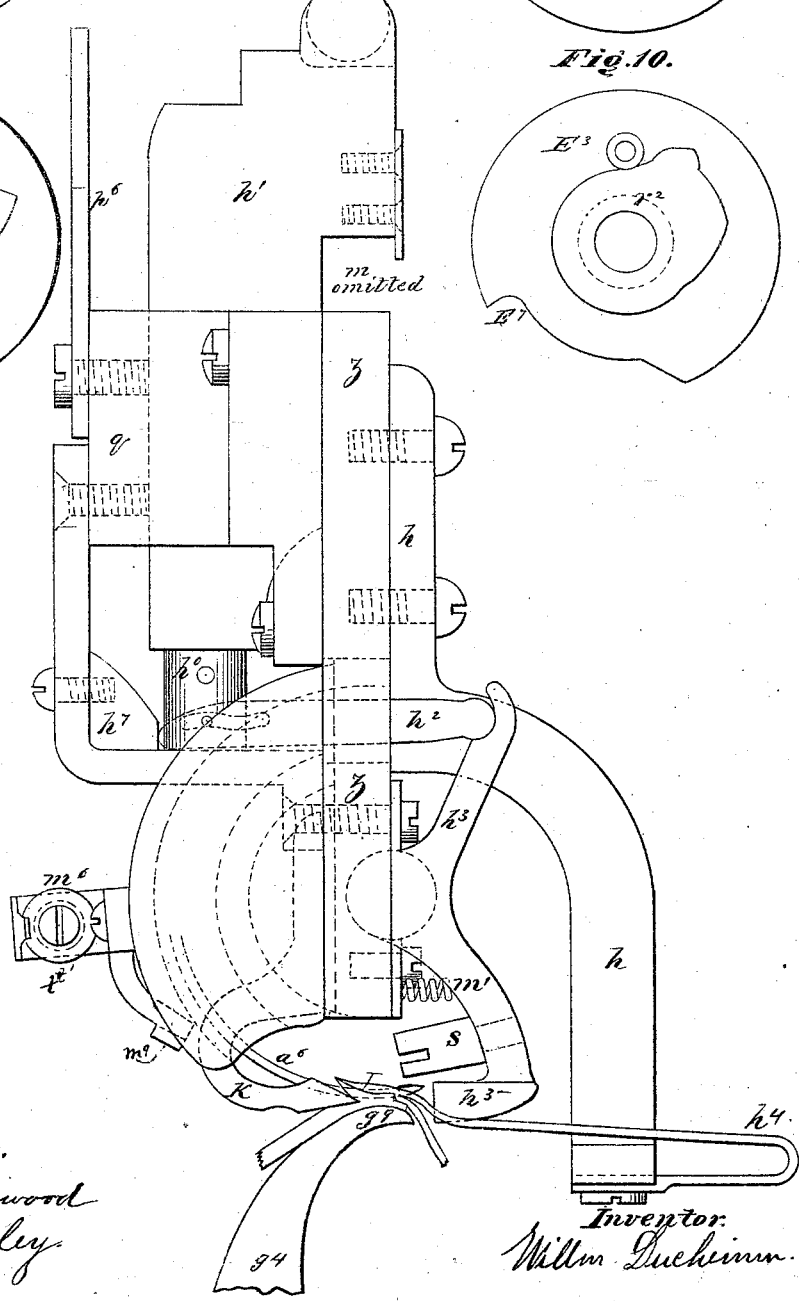

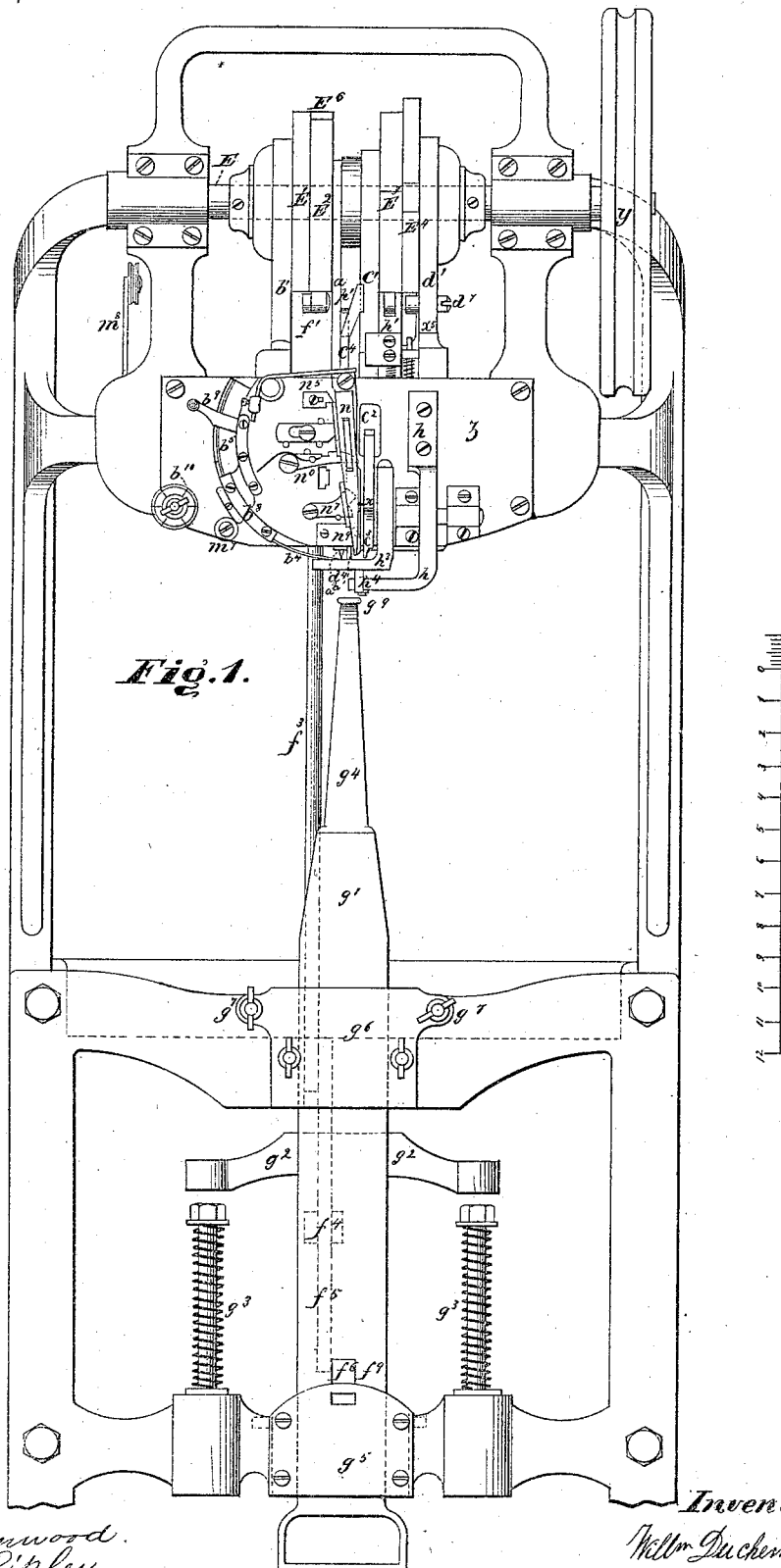

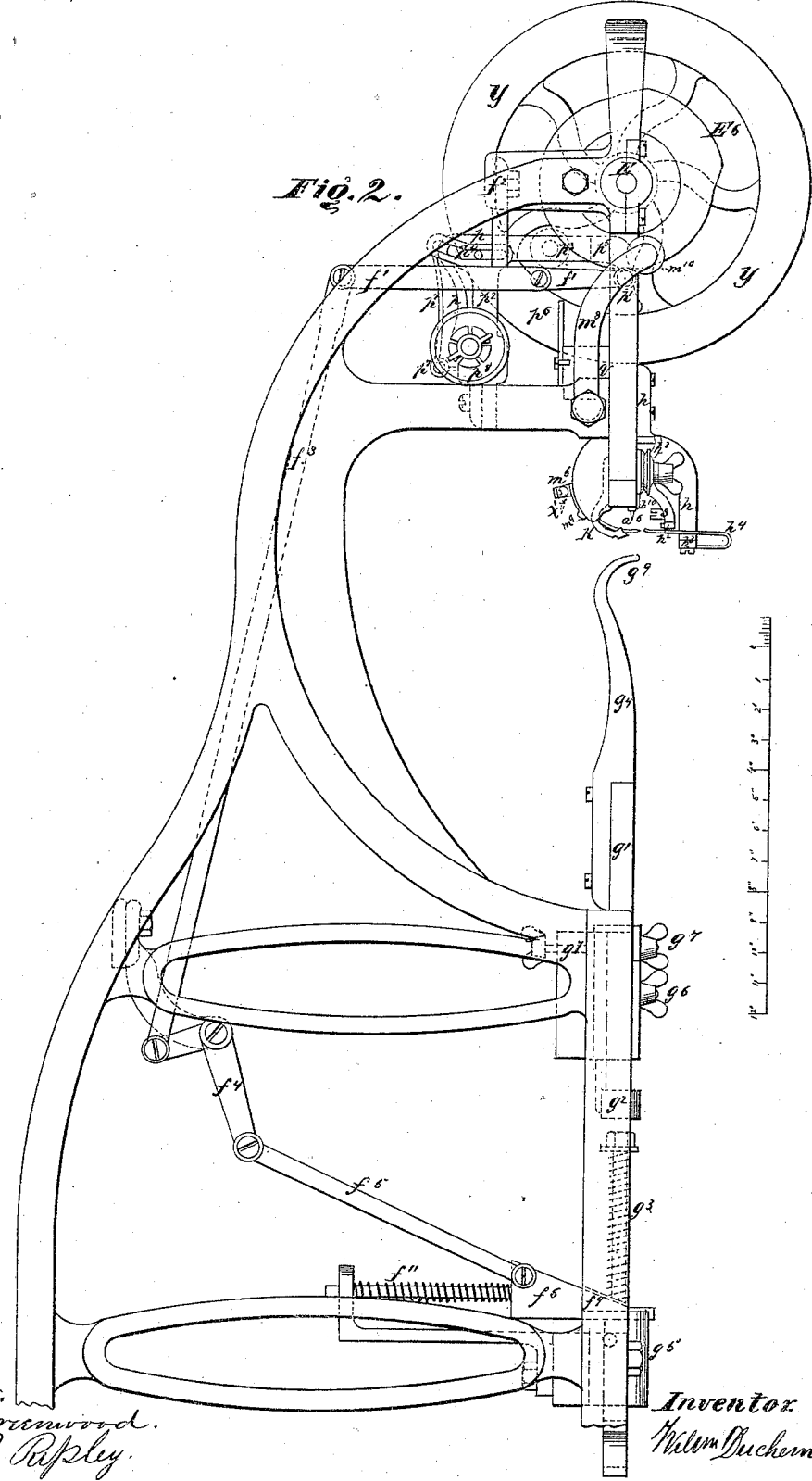

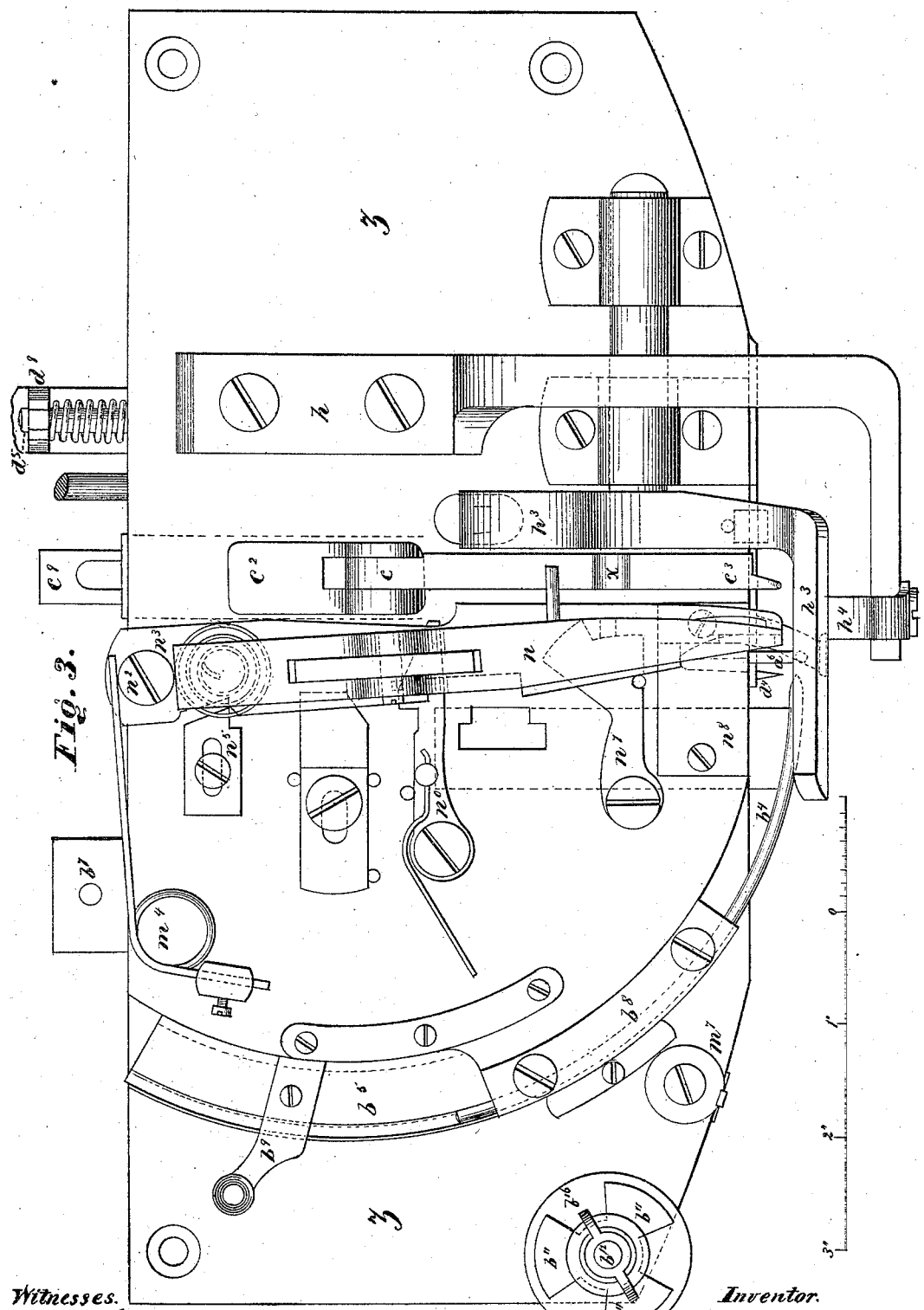

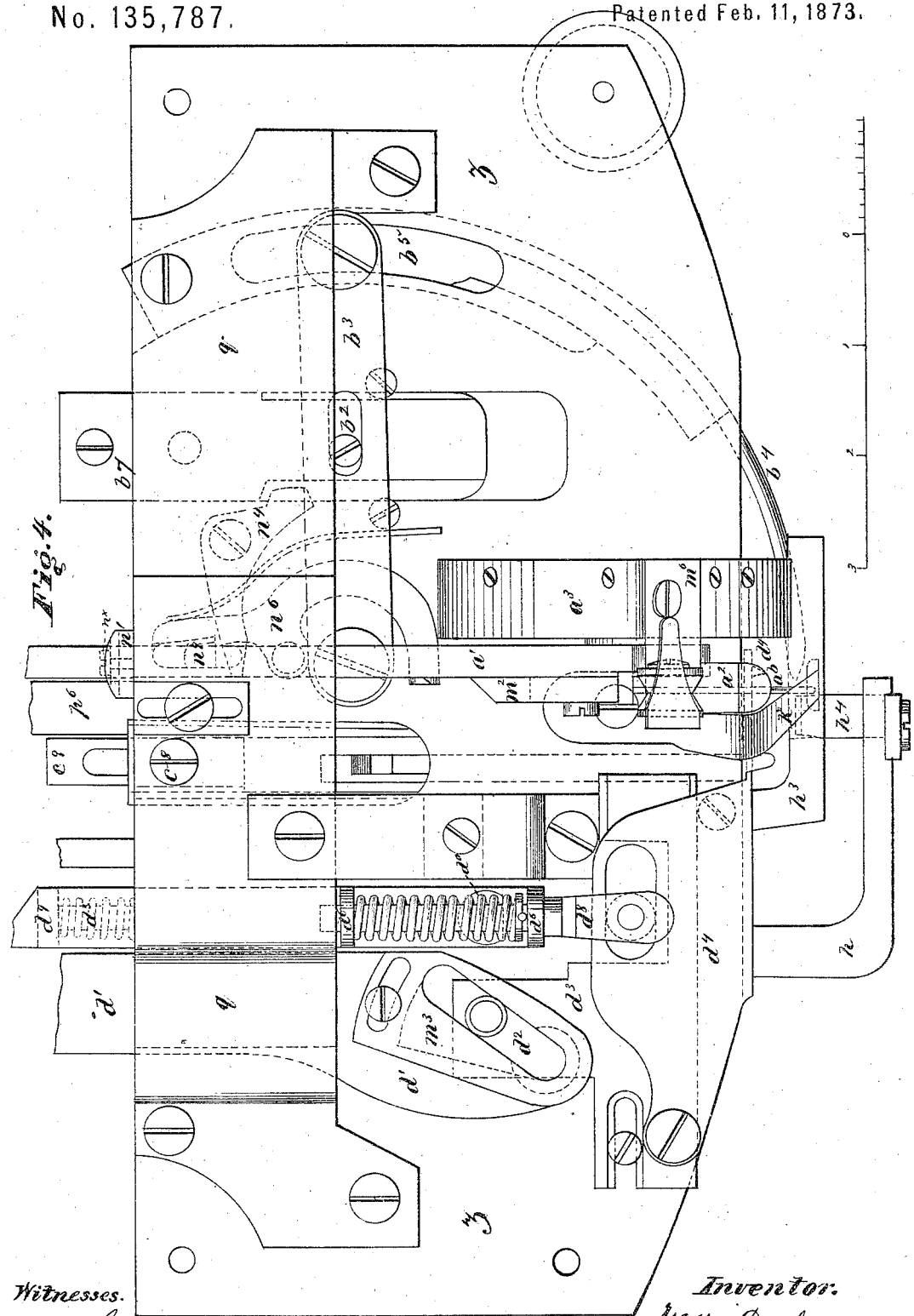

W. DUCHEMIN.
Sewing-Machines for Boots and Shoes.

No. 135,787.  Patented Feb. 11, 1873.

Witnesses.
Jas Greenwood
F. P. Ripley.

Inventor.
Willm Duchemin

UNITED STATES PATENT OFFICE.

WILLIAM DUCHEMIN, OF BOSTON, MASSACHUSETTS, ASSIGNOR TO GEORGE B. BIGELOW, TRUSTEE, OF SAME PLACE.

IMPROVEMENT IN SEWING-MACHINES FOR BOOTS AND SHOES.

Specification forming part of Letters Patent No. 135,787, dated February 11, 1873.

*To all whom it may concern:*

Be it known that I, WILLIAM DUCHEMIN, of Boston, in the county of Suffolk and State of Massachusetts, have invented an Improved Machine for Sewing Turned Shoes, of which the following is a description, reference being had to the accompanying drawing, in which—

Figure 6:
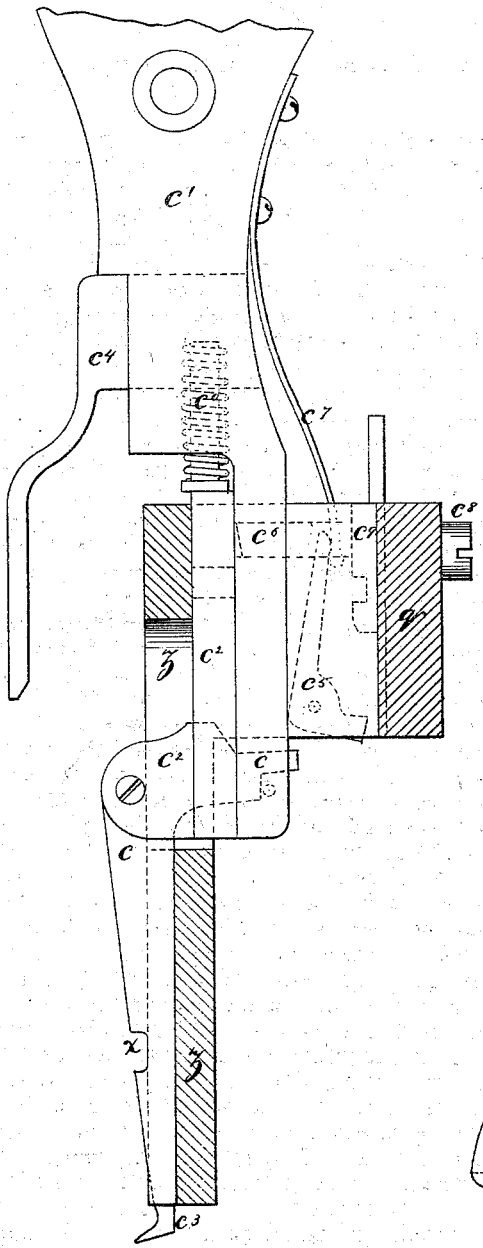
Figure 7:
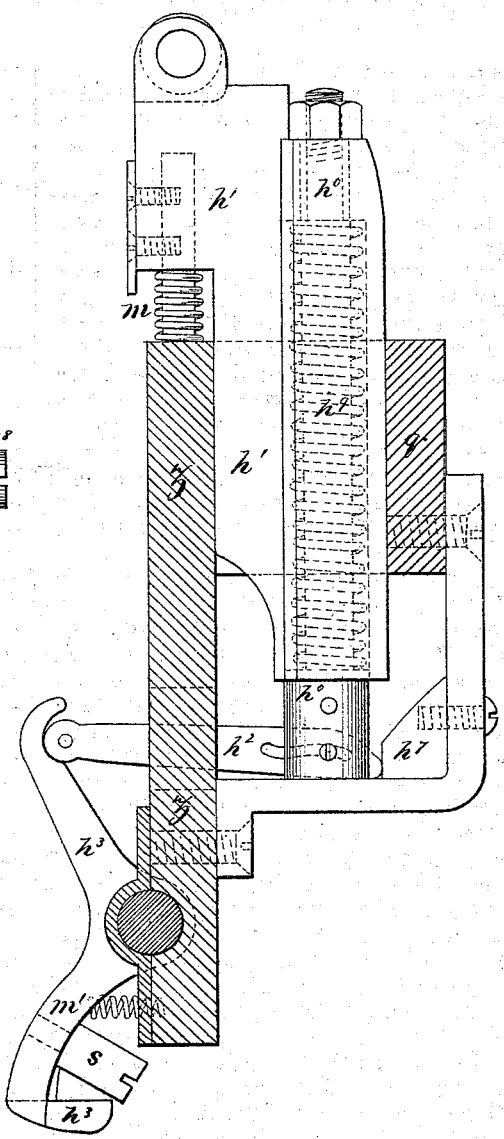

Figure 1, front view, quarter scale, legs of frame not shown; Fig. 2, side view, quarter scale, not showing, however, all parts; Fig. 3, face of plate, full size; Fig. 4, back of plate, full size; Fig. 5, section view, full size, showing the manner and shape the stock is presented in order to be sewed; Fig. 6, section view of picker-up and its adjuncts; Fig. 7, section view of presser-arm and its adjuncts; Fig. 8, thread-carrier cam; Fig. 9, needle and wedge cams; Fig. 10, picker-up and presser-arm cams; Fig. 11, feed and feed-presser cams.

In my improved machine I use two threads, carried by eye-pointed needles, and sew the shoe without a last. My needle being awl-pointed, with an eye a short distance from its tip, makes a smooth hole, and does not mutilate the upper when making its exit, while the second thread is laid in such manner against the upper, as will be hereinafter described, as to avoid puckering it. The material of which the shoe is composed, being relieved from the pressure of the last, is free to be drawn together by the thread, and it is also griped in such a manner as to give the stitch, when the shoe has been turned and beaten out, a circular upward curve, and at the same time the upper is pressed securely into the channel made for it in the sole. The shoe thus sewn is, after being removed from the machine, finished in the usual way. On the circular face of the cam $E^2$ is the projecting piece $E^6$, and directly under this, and having a roller fitted thereto, is one end of the lever $f^1$. This lever, by means of a pin, plays freely up and down in the hanger $f^2$ (see Fig. 2) fitted to the frame of the machine for that purpose. The outer end of this lever, by means of connecting-rods $f^3$ $f^5$ and crank $f^4$, governs the action of the wedge $f^6$. Thus, when the projection $E^6$ is directly over the roll the outer end of the lever $f^1$ is depressed and brings up the parallel arm of the crank $f^4$. This crank, by means of its perpendicular arm, communicates its motion at right angles to the connecting-rod $f^5$, and withdraws the wedge $f^6$ from the slot made for its reception in the standard $g^1$. The wedge $f^6$ is secured in position in such manner that it may traverse freely backward and forward. On its front it has a projecting lip, which passes through an opening in the box $g^5$, while it is secured at its back by a round iron bar, one end of which is screwed into the back of the said wedge; the other passes freely through an orifice drilled in the angle-piece fastened to the inside of the frame. On this round bar, and between the back of the wedge $f^6$ and the angle-piece, is a spiral spring, $f^{11}$, which serves to force forward and keep the wedge firmly in the slot $f^9$, made in the standard $g^1$, when not acted on by the projecting piece $E^6$. $g^1$ is the standard to which is fastened the arm $g^4$. This standard is fitted in the boxes $g^5$ $g^6$ in such a manner that it plays freely up and down in said boxes. These boxes are fitted in recesses made for the purpose in the frame. On each side, and near the top of the box $g^5$, parallel with its face, are two pivots, on which the box hangs, and which permit the said box to oscillate freely. The upper box $g^6$ is fitted in the recess in the frame in such manner that it is perfectly steady sidewise, but can be moved out and in freely. At each end of the outer flange of this box, fitted so they can traverse freely in said flange, their ends tapped or screwed into the outer face of the frame, are two graduating-screws, $g^7$, and in the back side of the recess in the frame at its center near the top is another graduating-screw, $g^7$, whose position is the reverse of the others. They act in the following manner: The boxes $g^5$ and $g^6$ having the standard fitted in them are placed in the recesses in the frame, the box $g^5$ hanging on its pivots. The two screws $g^7$ are passed through the outer flange of box $g^6$ and screwed into the frame until the back of said box touches the adjusting-screw set in the inside of the frame. By setting the back screws in and the front screws out the tip of the arm is moved outward; and by setting the outer screws $g^7$ in and the back screw out the tip of the arm is moved in. This is a very important part of my invention, for the reason that by regulating these screws the machine can be made to sew a sole from the thinnest feather-edge up to the full thickness of the leather. On the standard $g^1$ is the cross-bar $g^2$, on each end of which is a round bar running parallel with the standard $g^1$, on which are set the spiral springs $g^3$. These springs are stiff enough to keep the standard in the proper position while the feed takes place, and are elastic enough to let the leather pass freely over the tip of the arm $g^4$. At the upper end of the standard $g^1$ is screwed the arm $g^4$. The top of this arm $g^4$ at the back is shaped at an angle of about forty-five degrees. The front is rounded slightly to admit of the stock being kept clear of the thread-carrier $b^4$ when the stitch is being made, and, in conjunction with spring $h^4$ and sewing-gage K, molds or bends the sole, as it is being sewed, in such shape that the stitch assumes the form of an upward curve when the shoe is beaten out, and is additionally tightened by the process. On the outside circular face of the cam $E^3$ is a recess five-eighths of an inch deep. On a line with said face, and immediately under it, is the presser-bar socket $h^1$ fitted at its upper end with a five-eighths roll. In this socket is a round bar, $h^0$, having a check-nut at its upper end and a slot at its lower end, in which the inner slotted end of a lever, $h^2$, is held by means of a pin passing through bar $h^0$ and the slot in the lever $h^2$. The lower end of this rod fits the orifice in the stock, the upper portion of the rod being reduced sufficiently to allow a spiral spring, $h^9$, (see Fig. 7,) of the diameter of the lower end to pass over it. The hole in the stock is drilled the size of the outside diameter of said spring to near the top, and then reduced to the size of the bar over which the spiral is placed. The bar is confined in its proper place by the check-nut, the spring being held at the lower end by the offset on the rod, and at the upper by the offset in the socket. By setting up the nut any required pressure may be obtained. $h^2$ is the intermediate lever, the inner end of which plays freely in the slot in the bar $h^0$, resting upon and guided by the pin through said bar and lever. The outer end of lever $h^2$ is rounded or provided with a knuckle, which fits in a socket in the upper end of the presser-arm $h^3$, said socket being larger than the pivot or knuckle at the outer end of the lever $h^2$ to prevent straining the pivot. The arm, about midway down, is provided with a shaft, placed at right angles to the arm and fitted to turn in bearings in the face-plate $z$. At the extreme lower end of the arm is a laterally-projecting spur or foot, which operates the pressure-spring $h^4$. (See Fig. 2.) This spring is secured to the crooked arm $h$ that is fastened to the plate $z$ for the purpose. On the top edge of the face-plate is a pin, on which is placed the spiral spring, $m$. This pin passes into an orifice drilled for that purpose in the socket $h^1$, thus confining the spring between the edge of the plate $z$ and the offset in the socket. The action of this spring is to throw up the socket $h^1$ when relieved by the action of the cam $E^3$. Directly in line with the presser-arm, its upper end being fastened to the back-brace $q$ and its lower end to the face-plate $z$, is an angle-iron, in which is fastened the inclined plane $h^7$. Near the lower end, on the inside of the presser-arm $h^3$, with one end fitted on a pin placed in said arm for that purpose, the other fitted in a recess in the face-plate $z$, is the spiral $h^1$. Its action is to throw back the presser-arm when released by the recess $E^7$ from the pressure of the cam $E^3$. $E^4$ is the feed-cam, and $d^1$ the feed-cam rod, provided at its upper end with a slot that is fitted to traverse smoothly over the driving-shaft E, and with a roll that plays in the groove in the face of said cam, and at its lower end it has an angularly-slotted adjustable plate, $m^3$, by the adjustment of which, by means of a set-screw, the length of the feed can be varied from nothing to half an inch. The lower end of the plate $m^3$ has a circular projection and the upper end has a circular slot, the lower projection fitting accurately in the lower end of the cam-rod $d^1$, and a set-screw passing through the circular slot in the top end and fastened in the said cam-rod keeps it in place. The feed-slot, commencing from the center of the circular projection in the plate $m^3$, will always be in the same position, however much the upper end may vary. $d^3$ is the feed-carriage, fitted to the back of the plate $z$ in such manner that it is free to traverse back and forth. At its upper end is a roll that plays in the slot made in the plate $m^3$ for that purpose, and at the extreme lower end of the carriage $d^3$ is pivoted the feed-point $d^4$. This point, at its upper side, is provided with a slot in which the roll on the lower end of the spring-rod $d^8$ traverses, said rod being attached to the feed-presser carriage $d^6$ by means of perforated studs or ears in such manner that when the feed-point enters the leather it receives a solid pressure, and when the stock has been pierced it yields and gives the feed an elastic pressure—that is, the pressure will be firm enough to keep the point in the work and yet elastic enough to allow the material to pass freely over the top of the arm. The carriage $d^6$ is secured to the face-plate $z$ by a slot and screw, $d^0$, Fig. 4, at its lower, and is guided by the screw-pin $d^7$, Fig. 1, at its upper end. The spring-rod $d^8$ is provided at its lower end with a roll, and is turned to within a short distance of its lower end to fit the holes through the lugs on the carriage $d^6$, and has a collar fitted on it in such manner that a spiral spring placed between said collar and the upper stud in the carriage $d^6$ aids in giving elasticity to the feed. At the upper end of the pin $d^8$ a roll is fitted, which is acted on by the projecting piece $E^8$ on the cam $E^4$ for depressing the feed-point. On the upper edge of the face-plate $z$ is the pin $d^5$, surrounded by a spiral spring, said pin passing through the projecting stud $d^9$ on feed-presser carriage $d^6$, thus bringing the spring between the upper edge of the face-plate $z$ and the projecting stud $d^9$. The action of this spring is to throw the carriage $d^6$ up when relieved from the action of the cam $E^4$. The action of the feed is as follows, viz: The projecting surface $E^3$ on the cam $E^4$, acting on the roll placed on the end of the pin $d^7$, forces the feed-point $d^4$ into the leather; then, by the action of the cam $E^4$ on the cam-rod $d^1$, the rod is forced down the roller on the feed-carriage $d^3$, traverses the angular slot in the plate $m^3$, and the feed-point is forced forward. The presser-carriage $d^6$ is then relieved of its pressure and is forced up by the spring. The point $d^4$, relieved of its pressure, is drawn up, and the cam-rod $d^1$ coming back to its place by the action of the cam, the feed-point is brought back to its starting point for a new stitch. $c^1$ is the picker-up cam-rod. At its lower end, and arranged so that it may play freely up and down in the carriage $c^2$, to which the picker-up $c$ is pivoted, and near the top end of this carriage, there is a small hole for the reception of the locking-bolt $c^6$, set in the lower end of the cam-rod $c^1$, as shown in section in Fig. 6. The head of this bolt $c^6$ has two right-angular slots, one of which receives the lower end of the spring $c^7$, and allows it to play freely therein, and the other the upper end of the tripper $c^5$, provided with a projection or lip at its extreme lower end. Directly back of the tripper, and immediately over it, and secured to the back-brace $q$ by the screw $c^8$, is the trip-bar $c^9$. In the slot at the lower end of the cam-rod $c^1$, through which the top end of the picker-up $c$ passes, as shown in Fig. 6, and below a spur on the end of picker-up $c$ a pin $c^x$ is inserted, thus forming a square cavity for the reception of the upper end of the picker-up $c$. On the front side of the cam-rod $c^1$, immediately over the carriage $c^2$, is an offset in which is a recess to receive the pin $c^0$ and spiral spring, the lower end of which rests on said pin, and its upper end against the bottom of the recess in the rod $c^1$. When the picker-up is at rest the spring on pin $c^0$ keeps the picker-up point $c^3$ firmly against the plate $z$, as shown in Fig. 6. When at work the cam-rod $c^1$ is forced down by the action of the cam $E^3$, the carriage $c^2$ moving with it until its lower end touches the lower side of the recess in the plate $z$, when it remains stationary. The cam-rod $c^1$, still moving, acts on the backwardly-projecting upper end of the picker-up $c$, thus forcing its point $c^3$ outward between the thread-carrier and its thread. When the cam-rod has reached its lowest point the locking-bolt is acted on by its spring $c^7$ and shoots into place. The picker-up point is now thrown out, having the thread of the thread-carrier on it, and the spiral spring on pin $c^0$ on the top of the carriage is depressed in the cavity in the cam-rod $c^1$. The picker-up remains in this position until raised to a sufficient height to place the thread held by its point between the jaws of the fingers, at which time the upper end of the tripper $c^5$ will be acted on by the lower side of the stationary trip-bar $c^9$, and the bolt $c^6$ will be drawn out of the carriage; and, as the cam-rod $c^1$ still continues its upward motion, the carriage, being free and acted on by the spring, will remain down, and the pin in the rod $c^1$ will act on the end of the picker-up $c$ and throw its point $c^3$ back into the recess made for it in the plate $z$. The thread that was on the picker-up point having been deposited between the jaws of the fingers, the jaws close when the recess $x$ on picker-up $c$ reaches the pin on the outside of the upper finger $n$. The point of the picker-up then recedes, the thread-carrier $b^4$ is withdrawn, and the loop forming the outside of the stitch is formed. On the face-plate $z$, immediately over the needle $a^6$, with a protruding spur, $n^9$, which passes through said plate, is the carriage $n^1$, to which the fingers are secured by a pivot-joint formed by a screw-bolt, $n^2$, screwed in said carriage and through a socket in the top end of the inside arm of the fingers $n$. On the top of the carriage $n^1$, and extending at right angles directly over the upper edge of the plate $z$, is a small flange, in which is an adjusting-screw, $n^x$, the function of which will be hereinafter described. Directly over and nearly in line with the outside arm of said fingers, fastened to the cam-rod $c^1$, is the plate $c^4$. (See Fig. 6.) This plate opens the jaws of the fingers just enough to drop the loop on the loop-thread carrier $b^4$ immediately after its entrance into the recess formed for that purpose in the bottom end of the fingers $n$. On the plate $z$, near its top side, with an adjusting-slot, and fastened thereto by a screw-bolt, is the block, $n^5$, the function of which is to throw the fingers into position to take the thread from the picker-up after they have deposited the loop on the thread-carrier $b^4$. Lower down, secured by a pivot-joint and provided with a spring to keep it in position, is the latch $n^6$, the function of said latch being to enable the fingers to resist the friction of the point of the thread-carrier as it passes under them to receive the loop, and to retain them in the position they assume after the feed has taken place, and previous to their depositing the loop. This it does by latching on to a square stud set for the purpose on the inner side of the inside finger-arm. Lower down, secured by a pivot-joint, is the loop-gage $n^7$, which serves to give the loop the required length. $n^8$ is a plate, the outside surface of which forms the working-plane of the fingers, and its inside surface, in conjunction with a recess in the plate $z$, forms a groove in which the guide on the feed-arm immediately over the feed-point traverses, thus guiding and steadying the feed. $n^4$ is the finger-lifter, pivoted on the back of the plate $z$, the extreme upper end of its upper arm being immediately under the pin or spur $n^9$ in the finger-carriage, and the extreme end of its other arm resting against the projecting inner edge in a recess made for that purpose at the lower end of the back of the thread-carrier carriage $b^7$ for lifting the finger-carriage $n^1$, as will be explained. Outside of this lever is the finger let-off $n^6$, the pivot on which it works being in line perpendicularly with the projecting pin $n^9$ in the finger-carriage. The upper end of this let-off is furnished with a notch in which, when at work, the projecting pin $n^9$ rests. Its lower end is bent at right angles horizontally and projects beyond and by the side of the needle cam-rod $a^1$ in such manner that it is acted on by a cam, $m^2$, placed at the lower end of said cam-rod for that purpose. This let-off is provided with a spring to keep it to its work. Supposing the fingers to be latched in the position they assume immediately after the feed has taken place and preparatory to forming a stitch, the perpendicular arm of the lifter, acted on by the downward motion of the thread-carrier carriage $b^7$, is forced outward, raising its horizontal arm on which rests the projecting pin $n^9$ of the needle-carriage, thus raising the finger. This action commences when the point of the thread-carrier has entered the fingers a sufficient distance to insure said carrier's passing through the loop held by said fingers. Just before the lift takes place the inclined plane on the inner side of the plate $c^4$, before mentioned, by the action of the cam-rod $c^1$, is brought to bear on the upper end of the outside arm of the fingers, and depresses such arm slightly, opening the jaws just enough to let the loop free. The fingers, thus freed, rise perpendicularly until the square stud, before named, is clear of the clutch of the latch $n^0$, when the block $n^5$, acting on the inclined plane made for the purpose on the side and near the top of the inside arm of the fingers, throws them over into position to take the thread from the picker-up. In the side of the outside arm of the fingers is a pin, so placed that it is acted on by the picker-up arm $c$, which, in coming out to pick up the thread from the thread-carrier, bears against the pin and keeps the fingers open until the thread is placed between the jaws by the picker-up, when the picker-up springs back, as before explained. As the cam-rod $c^1$ rises, the fingers are acted on by the conical spring at their top end, close over the thread. The thread-carrier $b^4$ then recedes, and as its cam-rod $a^1$ is drawn up the lifter $n^4$ is relieved, which allows the fingers, through the action of the spring $m^4$ on the plate $z$, to fall until the projecting pin $n^9$ in their carriage rests in the notch made for that purpose in the let-off $n^6$. This lets them down just enough for the square pin on the inner side of the inside arm of the fingers to bear against the extreme end of the loop-gage $n^7$, which by its action keeps them firmly braced against the action of the tension in bringing the loop home. They remain in this position until the eye of the needle $a^6$, as it recedes, enters the stock, when, by the action of the cam-block $m^2$ on the needle cam-rod $a^1$ at its lower end, the let-off $n^6$ is forced back and lets the fingers drop until they are free from the resistance of the loop-gage $n^7$, thus leaving them at perfect freedom, when they are drawn by the tension of the needle-thread directly in line with said needle, and the slack thread of the loop, by the same tension, is drawn in, thus forming a secure lock-stitch. The loop, being thus drawn tight, takes the fingers with it, when the feed moves the work forward. The latch $n^0$, by reason of its spring, yields until the stud before named is over the recess formed for its reception, when it springs into place and the fingers are secured ready for the next stitch. $E^2$ is the needle-cam. $a^1$ is the needle-cam rod, provided with a roll at its upper and pivoted to the needle-carriage $a^2$ at its lower end. This needle-carriage is circular in form, and is made to play freely and steadily in the needle-carriage race $a^3$. In its outer face a groove is cut of suitable proportions to take the needle. The needle is fastened to the carriage $a^2$ by a small segmental plate, also provided with a groove, through which two screws pass into the carriage $a^2$. The needle is passed between the two and held firmly by the action of the screws on said plate. The cam-rod $a^1$ is pivoted in its place by a screw-bolt, not seen, in a cavity formed for that purpose, the face of the needle-carriage $a^2$ forming one side and a lug firmly secured on said carriage the other. The pivot passes freely through the lug, and is screwed into the carriage $a^2$. The end of the cam-rod fits perfectly into a circular joint made for that purpose. This is done that the pivot may not be strained in forcing the needle through the leather. On the back of the needle-race $a^3$ there is fastened an angular piece, $m^6$, the lower end of which (see Fig. 2, but not shown in Fig. 3) has a boss, $m^9$, grooved in line with the needle $a^6$ to receive the needle-thread on its passage to the needle. A little back of this boss, and fastened to a standard provided for that purpose, is a roll, $t^1$, whose groove is in line with the groove cut in the boss $m^9$. At the back of this roll is a small spring-plate, which just touches its extreme edges and keeps the thread in the groove when the tension is slackened by the action of the cam-rod $a^1$. The thread is passed over the roll, through the groove in the boss, to the eye of the needle, and when the full tension is on the thread the roll, and not the needle, takes the strain.

The motion of the needle $a^6$ is peculiar. When acted on by its cam it is brought forward until the inner end of the eye is one-eighth of an inch beyond the line of the thread-carrier $b^4$, when it recedes a little to slacken the thread for the passage of the thread-carrier $b^4$, and remains stationary until said thread-carrier has performed its part in forming the stitch. The needle then moves forward again, bringing its full tension to bear, by this means fastening the loop dropped by the thread-carrier in its return to the position it assumes just before taking a stitch. $E^1$ is the thread-carrier cam. $b^1$ is the thread-carrier cam-rod. This rod terminates in a carriage, $b^7$, that traverses freely in a recess made for it in the back of the plate $z$. About midway in the center of this carriage is the pin $b^2$, which traverses in a slot made in the lever $b^3$. The inner end of this lever is connected to the back of the plate $z$ by a pivot-joint, and its outer end by a screw to the circular carriage $b^5$, which traverses in a circular recess in the outer face of the plate $z$. To the lower end of this carriage $b^5$ the thread-carrier $b^4$ is secured by the segmental plate $b^8$, said plate being provided with screws for that purpose. On the inner side of the carriage $b^7$ is formed a recess which terminates in an inclined plane, and which, operating on the angular lever $n^4$, lifts the fingers $n$, as before described. By the action of the cam $E^1$ a downward motion is given to the cam-rod $b^1$, whose pin $b^2$ moves the cross-lever and the circular carriage $b^5$. When the thread-carrier has gone the length of its throw it remains stationary until its thread is taken by the picker-up $c$, when it returns, tightening its thread, and then moves forward a little to slacken its thread sufficiently to insure the proper interlocking of the threads. On the upper end of the circular carriage $b^5$ is fastened the projecting ring $b^9$, and on plate $z$, immediately below it between two friction-plates, $b^{16}$, is the grooved thread-carrier tension-roll $b^{10}$. This roll works freely about its pivot, while the friction-plates between which it traverses remain stationary. Over the outside friction-plate there is a circular spring-plate, $b^{11}$, which, acted on by the thumb-nut $b^{12}$, produces the necessary pressure on the plates and roller, and governs the tension on the thread.

To thread the carrier $b^4$ the thread must be brought over the roll $m^{10}$, attached to the frame $m^8$, and wound twice round the tension-roll $b^{10}$, then through the ring $b^9$, passing inward, then under the roll $m^7$, and into the eye of the thread-carrier $b^4$. This thread-roll $m^7$ has a groove cut round it and a spring-plate at its lower edge, which prevents the thread from coming off said roll when slackened by the action of the cam $E^1$, and must be placed level with the lower side of the thread-carrier $b^4$, and thus relieve said carrier from the pressure of the thread when under full tension. $p$ is the tension-bar resting at its inner end on the roll $p^1$, pivoted on the cam-rod $a^1$, Fig. 1, and at its outer end in the slot in the top end of the standard $p^2$, Fig. 2, and this bar, near its center, has a slot in which is fastened an independent roll, $p^3$. Near the outer end of the bar is a pin, $p^4$, which traverses in a slot made in the top end of the standard $p^2$. These slots are made at right angles with the groove in which the tension-bar $p$ traverses, and terminate in an upward curve at the outer end. Just beyond the pin the bar $p$ is bent down at right angles, the lower end of the bent arm resting on the face of the standard $p^2$. At its inner end, on the side nearest the cam-rod $a^1$, is fastened the block $p^5$, whose lower surface is concaved downward. On the side of the standard $p^2$, between two friction-plates, is the needle tension-roll $p^8$, made in all respects, except size, like the tension device $b^{10}$. In the bottom of the standard (its upper end pressing against the tension-bar $p$) is an angular spring, $p^7$, intended to keep the bar steady while at work. Fastened to the back-brace $q$, immediately under the bar $p$, is the upright $p^6$. The object of these devices is to give a "repeating tension"—that is, tension when the needle is making the last quarter of its outward course to finish the stitch previously set, and tension when it is making the last quarter of its return to insure the interlocking of the thread in forming the stitch. When at work, and the cam-rod $a^1$ has a downward motion, the tension-bar is forced forward by the spring $p^7$, when, by means of the bent arm resting on the face of the standard, and the pin $p^4$ working in the slots, a long elliptic motion is given to the bar $p$, thus throwing the long lip of the concaved block $p^5$ suddenly over the roll $p^1$, and the pin $p^4$ out of the curve in the slot in which it traverses, thus giving slack thread. When the cam-rod $a^1$ has traversed two-thirds of its distance down, the bar $p$ is checked by the upright $p^6$, the bar thus remaining stationary, and as the needle cam-rod $a^1$ still continues to move downward, the thread is tightened while the needle is moving forward through the leather and in its last quarter forward movement. In rising from its downward throw, the cam-rod $a^1$ makes one-third of its distance before the tension-bar moves, thus giving the slack thread required until the last quarter of the return movement, when, by the action of the arm bearing against the face of the standard $p^2$, the pin $p^4$ is forced up the inclined plane in the slots $p^2$, and the concave block $p^5$ up over the roll $p^1$, thus giving the thread strong tension to draw the stitch. K is the sewing-gage, fastened to the plate $z$, and projecting about half an inch below the bottom of the said plate. It has two distinct functions, viz., that of guiding the shoe while being moved forward by the feed-point $d^4$, and also of governing the entrance of the needle into the leather as each stitch is being formed. For this latter purpose, on the upper side of its foot it is provided with a segmental groove of the same diameter as and in which the needle works, and this groove is deep enough to allow the point on the needle to come directly in the center of the channel in the sole, while the projections on either side of the groove serve to keep the stock clear of the needle while performing its work. The needle $a^6$ is circular in form, and provided with an eye about three-eighths of an inch from its point; and near this eye, on the side next the thread-carrier $b^4$, the body of the needle is cut away or inclined about two-thirds across the top side and down to the lower face. The needle is so shaped because the fingers are so arranged that when the thread-carrier $b^4$ enters the groove at their lower end for the purpose of taking the loop, they depress its point to nearly the level of the lower side of the needle. The inclined plane, therefore, is to aid the carrier in passing over it, while the pressure of the finger keeps the carrier-point in close contact with the needle, and the carrier passes between the needle and its thread. The lower side of the needle is grooved deep enough to keep the thread clear of the stock when it is at work. The thread-carrier $b^4$ is made just wide enough to traverse in the groove made for its reception in the lower end of the fingers; is provided with an eye near its point for the reception of its thread; and just behind the inner end of the eye, at right angles with it, there is a small half-round groove, deepest on its inner side, in which the point of the picker-up $c^3$ passes to take the loop from said carrier. The bottom of the carrier $b^4$ is made angling to suit the curve of the needle, and is provided with a groove on its under side deep enough to keep the thread clear of touching the needle as it passes over it. The back brace $q$ is a straight bar, secured to the back and in line with the top side of the plate $z$, and has two functions—one to strengthen the plate, the other to keep the working parts of the machine firmly in their places.

To set the needle $b^4$ in working position, bring the circular carriage $b^5$ to the extreme length of its outward throw; then place it in the slot in the carriage and under the segmental plate $b^8$, and so that its point will enter the slot cut in the standard $s$ of the pressure-arm $c^3$. The groove at the inner end of the eye of $b^4$ will then be directly under the picker-up, so that the picker-up point may pass through it in taking the loop. The function of the standard $s$ is to keep the thread-carrier in position to receive the picker-up and enable it to resist the friction of the picker-up in passing through its groove and taking the thread.

In threading the needle $a^6$, give the thread two turns round the tension-roll $p^8$ at the bottom of the standard $p^2$, commencing from the top of said roll, inward; thence to the inner side and over the roll $p^3$ in the bar $p$; thence under the roll $m^6$ in the angular brace on the needle-race $a^3$; thence through the groove in the boss $m^9$, and through the eye of the needle from the bottom side. In passing over the roll $p^3$ the thread is crossed in order to keep it clear of the back brace $q$.

To place the shoe on the machine, depress the standard $g^1$ by placing the foot in the stirrup-iron at its lower end; then turn the fly-wheel $y$ forward until the feed-point $d^4$ comes down for the purpose of piercing the work preparatory to moving it; then turn the wheel back to raise said point until it nearly touches the bottom of the plate $z$; then place the foot of the sewing-gage K well in the inner channel of the shoe, just at the edge of the counter of said shoe; then let the standard $g^1$ rise to its position, and set the machine at work. These directions being followed, and the shoe in position, the wedge $f^6$, by the action of the spiral spring $f^{11}$, is forced in its recess in standard $g^1$. The presser-arm $h^3$, acted on by its adjuncts, is brought to bear on the presser-spring $h^4$, when the shoe assumes the position shown in section in Fig. 5. The needle is then brought forward about half a revolution, when it recedes and remains stationary long enough to allow the thread-carrier $b^4$ to pass under its thread. When the thread-carrier $b^4$ has completed its forward movement, the picker-up $c$ springs forward and lifts the thread thus presented to it by the carrier $b^4$, and deposits it between the jaws of the fingers $n$, which have been lifted into position by the lifter $n^4$. The picker-up then falls back to its original position, and the thread-carrier $b^4$ then recedes. When the thread-carrier is half-way back, and before its tension is brought to bear on the loop, the lifter $n^4$ is relieved, and the fingers $n$ fall until caught by the let-off $n^6$; but they are still held forward by the loop-gage $n^7$ to give the loop the proper length. When, by the action of the carrier $b^4$, the loop is formed, the needle $a^6$ again moves forward, thus setting the previous stitch; but before this last movement of the needle $a^6$ the carrier $b^4$ has completed its backward movement and dropped the loop it received from the fingers $n$ when coming forward, and it has also moved forward a little, thus leaving the needle $a^6$ free to tighten the previous stitch, as aforesaid. The needle $a^6$ then recedes to its original position, and, just as its eye touches the stock, the let-off $n^6$, acted on by the cam-block $m^2$ on the lower end of the cam-rod $a^1$, lets the fingers $n$ drop clear of the loop-gage $n^7$, leaving them free to be acted on by the tension of the needle-thread, which draws them directly over the needle $a^6$. At the same time they are so released, the thread-carrier $b^4$ comes forward far enough to give slack thread, thus allowing the needle-thread to interlock firmly with the loop held by the fingers $n$. The presser-arm $h^3$ relieves the spring $h^4$, the feed-point $d^4$ is forced into the stock, the wedge $f^6$ is removed, and the work moved forward to receive another stitch.

In building machines attention must be paid to the following dimensions and positions of the parts named: The needle being on a three-inch circle, the grooves in which it is secured must be the same diameter, and its race must be situated on the back of the plate $z$, so that the center of the needle's circle will be one-quarter of an inch from the outer face of the plate $z$, and one inch from its bottom edge.

The thread-carrier carriage $b^5$ must be so situated that the bottom side of the carrier $b^4$ will touch the top side of the needle $a^6$. This carriage works on an eight-inch circle. To find its center horizontally, strike a perpendicular line directly over the needle. Said center will be one-quarter of an inch from the perpendicular line toward the carrier. The carriage must project from the face of the plate so that the inner side of the carrier $b^4$ will be an eighth of an inch from the face of said plate $z$.

The extreme tip of the sewing-gage foot K must be five-sixteenths of an inch from the face of the plate $z$, and set so that the groove at its upper side will touch the lower side of the needle $a^6$.

The plate $n^3$, on which the fingers play when in motion, should project beyond the face of the plate $z$ three thirty-seconds of an inch.

The lower side of the recess at the top of the inner side of the arm of the under finger $n$ on which the graduating-block $n^5$ operates in throwing the fingers into position for receiving the loop, should be three-quarters of an inch lower than the center of the pivot on which said fingers play, and one-eighth of an inch deep.

The clutch at the end of the latch $n^6$ must be in such relative position with the square stud on the back side of the inner finger-arm $n$ that it will latch on said stud when the fingers are brought forward by the action of the feed, and must be one-eighth of an inch deep.

The bottom side of the point of the picker-up $c^3$ should be in such position that it will touch the bottom of the groove at the point of the thread-carrier $b^4$ while passing out to take the loop; and the recess $x$, made in the picker-up $c$, must be deep enough to allow the fingers to close when the spur at the side of the outer finger $n$ drops therein, thus enabling the finger to close before the loop is dropped by the picker-up $c$.

The jaws of the fingers must close over one another in such a manner as to give the thread of the thread-carrier $b^4$, which they take, a quarter turn.

The thread-carrier cam $E^1$ should be so timed with the needle-cam $E^2$ that the point of the thread-carrier $b^4$, when in position, will touch the side of the needle nearest it in its groove just as said needle has been drawn back to slacken its thread for the carrier to pass.

The picker-up cam $E^3$ should be so timed that the picker-up point $c^3$ will spring out just as the carrier $b^4$ has made its full throw forward and reached its support, the standard $s$.

The feed-cam $E^4$ must be timed so that it will move the feed-point forward when the needle has completed its revolution forward and back and is at rest.

The feed-pressure cam, situated on the outside of the cam $E^4$, should be so timed that it will send the feed-point $d^4$ into the stock just before the wedge $f^6$ is withdrawn from the standard $g^1$.

The recess in the cam $E^3$ must be so timed that it will release the pressure-bar arm $h^3$ and spring $h^4$ just before the feed-point $d^4$ enters the stock.

The wedge-cam on the outside of the cam $E^2$ should be so timed that the wedge $f^6$ will remain in position until after the pressure-spring $h^4$ is released and comes into position just before the presser-arm $h^3$ is brought to bear on the presser-spring $h^4$.

The cams $E^1$ and $E^2$ face in opposite directions—$E^1$ to the left, $E^2$ to the right. $E^1$ fits over a boss, $r$, on the side of $E^2$, and is firmly attached to it by means of a screw through the graduating-slot $r^1$, in $E^1$, Figs. 8 and 9. The cams $E^3$ and $E^4$ are similarly fastened together by means of the boss $r^2$ on $E^3$, and slot $r^3$ and set-screw in $E^4$, Figs. 10 and 11. $E^3$ faces to the left, $E^4$ to the right.

The presser-spring $h^4$ must be so placed that there will be a space between its extreme outer point and the shoulder of the outside channel of the thickness of the upper stock. Thus the upper stock is pressed firmly against the sole without injuring said shoulder, and will give a perpendicular surface where the needle pierces it, thus enabling the presser-spring $h^4$ to govern the passage of the needle $a^6$ through the sole and upper, as each stitch is being made. The spring $h^4$ is provided with a slot in its lower arm where attached to standard $h$, so that it may be set forward or back to suit the various thicknesses to be sewed.

I claim, and desire to secure by Letters Patent, in a machine for sewing turned shoes with a double thread, and without a last—

1. The needle and thread-carrier, combined and operating, as described, so that the needle $a^6$ has a positive movement forward, as explained, after the thread-carrier has been withdrawn, in order to tighten the previous stitch.

2. The combination, with the thread-carrier $b^4$, of the picker-up $c^3$, and fingers $n$, these parts being constructed and operating substantially as described.

3. In combination with the thread-carrier $b^4$ and fingers $n$, the loop-gage $n^7$, for determining the length of the loop formed by said thread-carrier and fingers, substantially as described.

4. The take-up lever $p$, operated by the cam-rod $a^1$, slotted standard $p^2$, and spring $p^7$, for imparting tension to the needle-thread at each end of the stroke of the needle, substantially as described.

5. The adjustable stop $p^6$, in combination with the take up-lever $p$, and the tension-roll for regulating the tension of the needle-thread during the forward stroke of the needle, substantially as described.

6. The combination of the slotted standard $p^2$, the bar $p$, and rollers $p^1$ $p^3$ $p^8$, substantially as described.

7. The combination of the sewing-gage K, presser-spring $h^4$, presser-arm $h^3$, and arm $g^5$ having its upper surface curved, substantially as set forth.

8. In combination with a needle or a thread-carrier moving in an arc of a circle, a stationary guide or support for the thread, arranged substantially in the described relation to the needle or thread-carrier, to prevent the thread from being deflected when the stitch is being drawn up, as set forth.

9. In combination with the thread-carrier $b^4$ and picker-up $c$, the standard $s$, for supporting the thread-carrier and maintaining the loop formed by it in proper position to be taken by the finger $n$, substantially as described.

10. The block $n^5$, in combination with the finger $n$ and finger-carriage $n^1$, substantially as and for the purpose set forth.

11. In combination with standard $g^1$, the set-screw $g^7$, for adjusting the position of the top of the arm $g^9$ relative to the sewing-gage K and presser-spring $h^4$, substantially as described.

WILLM. DUCHEMIN.

Witnesses:
H. H. DOUBLEDAY,
JOHN BIGELOW.